United States Patent [19]

Rosa

[11] 3,977,689

[45] Aug. 31, 1976

[54] NESTABLE CART
[75] Inventor: Ronald L. Rosa, Eagan, Minn.
[73] Assignee: The Cornelius Company, St. Louis Park, Minn.
[22] Filed: Feb. 25, 1975
[21] Appl. No.: 552,983

[52] U.S. Cl. .......................... 280/33.99 H; 211/150; 280/79.3
[51] Int. Cl.² ...................... B62B 1/12; B62B 11/00
[58] Field of Search ............. 280/33.99, 36 R, 79.3; 211/150, 178 R; 16/180, 189

[56] References Cited
UNITED STATES PATENTS

| 2,762,669 | 9/1956 | Watson ........................ 280/33.99 R |
| 2,762,669 | 9/1956 | Watson ........................ 280/33.99 R |
| 3,191,959 | 6/1965 | Heimbruch et al. ......... 280/33.99 R |
| 3,746,358 | 7/1973 | Swick et al. ................... 280/79.3 |
| 3,810,648 | 5/1974 | Hallenius ..................... 280/33.99 R |
| 3,840,242 | 10/1974 | Craig et al. .................. 280/33.99 H |
| 3,840,243 | 10/1974 | Rheinhart et al. ........... 280/33.99 H |

FOREIGN PATENTS OR APPLICATIONS
1,169,317  11/1969  United Kingdom ......... 280/33.99 H Primary Examiner—Kenneth H. Betts
Assistant Examiner—David M. Mitchell
Attorney, Agent, or Firm—Henry C. Kovar

[57] ABSTRACT

A nestable merchandise cart including a rear frame and hinged side frames which pivot outwardly until limit stops are engaged, and a movable shelf which, when in place to support a load, locks the side frames into positions generally perpendicular to the rear frame. The shelf can be raised and stored, which releases the side frames to pivot outwardly and form a tapered nest into which a like cart will fit nestingly. The side frames may be biased outwardly by springs and pivot outwardly automatically when the shelf is raised, and may also pivot inwardly against the rear frame to a collapsed position suitable for high density packing and shipment of the cart.

16 Claims, 7 Drawing Figures

NESTABLE CART

BACKGROUND OF THE INVENTION

1. Field of the Invention

This invention pertains to a nestable merchandise display cart.

2. Prior Art

Carts have been provided previously that enable nesting for the purpose of economizing storage space when not in use. One type of such cart has side frames fixed to a rear frame and forming a divergent angle into which a like cart will nest. In use, merchants dislike this cart because rectangular shaped packages will not stack evenly, internal cart space is wasted and floor display space is also wasted due to the tapered sides of the cart. Another disadvantage is that this cart requires considerable space for shipment to a user and the shipping costs of the cart from the manufacturer are excessive.

Another type of nestable cart has a fixed nestable base, a fixed rear frame and collapsible side frames and upper shelf which lock individually. This cart typically requires several manual operations to collapse for nesting and as a consequence many handlers using the cart will not collapse it. Also, this cart is inefficient for shipping because when nested in a truck, the fixed bottom of the last cart requires the space of one fully open cart.

A third type of prior cart is completely foldable; this cart has the advantage of requiring very little space when collapsed and is the most economical previously known type to ship from manufacturer to customer. However, it has serious disadvantages when in use in that it is unstable when collapsed, only one collapsed cart can be moved at a time, and the operations required to fold the cart are time consuming and thereby avoided by the individuals who use the cart.

SUMMARY OF THE INVENTION

In accordance with this invention, a nestable merchandise cart is provided with an upright rear frame having hinges on each side, a pair of side frames connected to the hinges and pivotable outward from normal positions perpendicular to the rear frame to alternate position forming a divergent opening between the sides for nesting, a shelf hinged to a frame and having locks to secure the side frames in the normal position, and means to limit outward pivoting of the side frames; the cart may include means for biasing the side frames outwardly to the nesting position.

Accordingly, it is an object of the present invention to provide an improved nestable merchandise cart.

Another object of the present invention is to provide a nestable merchandise cart which is extremely efficient in utilization of display space.

A further object of the present invention is to provide a nestable merchandise cart which is very easy to use and requires a minimum of motion to make nestable.

Another further object of the present invention is to provide a nestable merchandise cart which is stable and self-supporting when nestable.

Yet another object of the present invention is to provide a merchandise cart which can be simultaneously moved about together with other similar carts while nested.

Another object of the present invention is to provide a nestable merchandise cart which is collapsible for shipment.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 1:
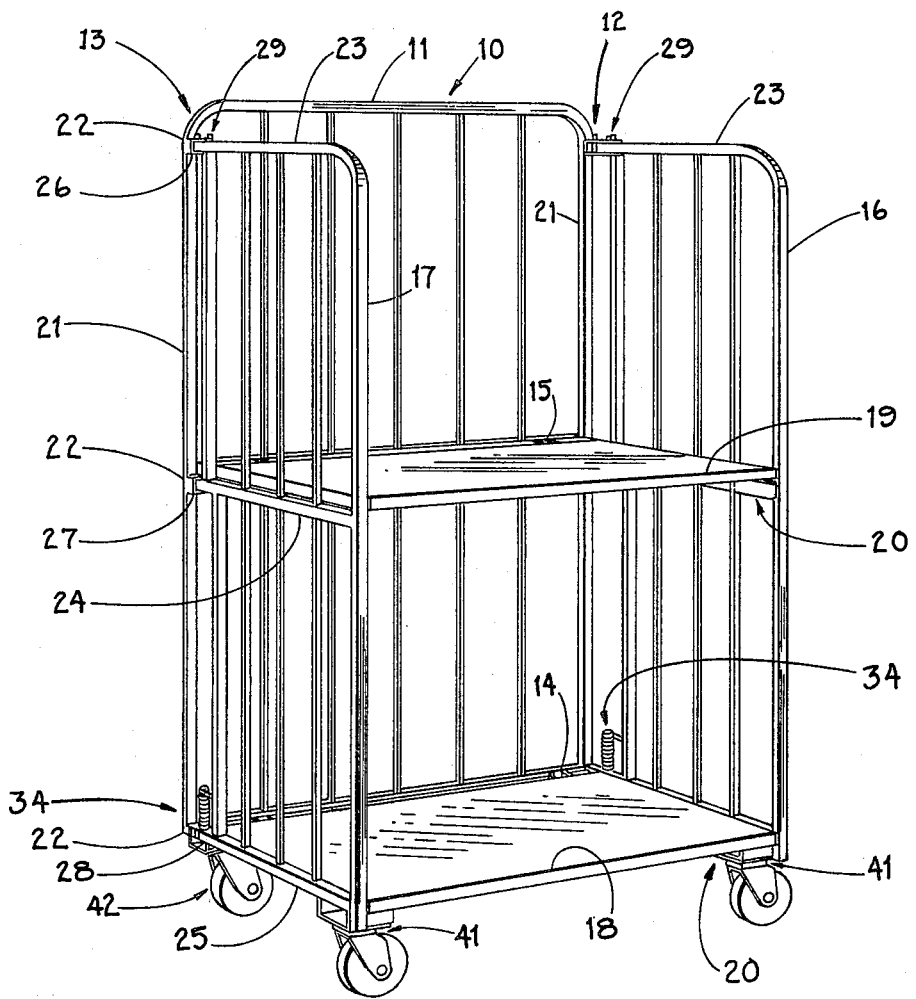
FIG. 1 is a perspective view of a nestable cart provided in accordance with the principles of the present invention.

The principles of the present invention are particularly useful when embodied in a nestable merchandise cart of the display type as illustrated in FIG. 1, generally indicated by the numeral 10. The cart 10 includes an upright rear frame 11 having vertical axis hinges generally indicated by 12, 13 on opposite sides and transverse hinges 14 and 15.

Side frames 16 and 17 are pivotally connected by vertical hinges 12, 13 to the rear frame 11 and shelves 18 and 19 are pivotally connected to the rear frame 11 by transverse horizontal axis hinges 14 and 15. Lock means generally indicated by 20 lock the side frames 16 and 17 perpendicular to the rear frame 11, as is shown in FIG. 1, and support the shelves 18, 19 in a generally horizontal position.

The rear frame 11 is of generally rectangular shape and has an upright side post 21 on each side and spacers 22 which are attached to and extend forward from the rear frame 11 and carry the vertical hinges 12, 13. The side frames 16, 17 are pivotally mounted on opposite sides of the rear frame 11 by a respective vertical hinge 12, 13 and are pivotable about the axis of the respective vertical hinges 12, 13 for nesting and for storage as will be later explained.

Figure 2:
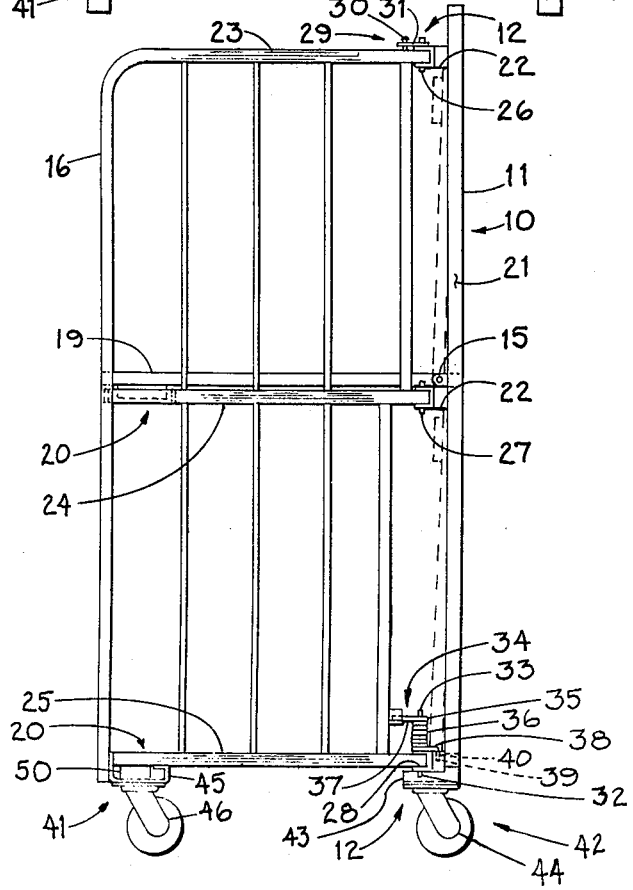
FIG. 2 is a side view of the structure of FIG. 1.

The side frames 16 and 17, as best shown in FIG. 2, each have an upper 23, intermediate 24, and lower 25 generally horizontal structural member which members 23, 24, 25 are individually connected by the hinges 12, 13 to the rear frame 11. The hinges 12, 13 each have an upper joint 26, intermediate joint 27 and lower joint 28. An important feature of the present invention is limit means generally indicated by 29 mounted jointly to the rear frame 11 and each side frame 16, 17 for limiting outward pivotal movement of side frames 16, 17 to a nesting position. In the preferred embodiment shown, a pin 30 is mounted in each side frame 16, 17 and pin stops 31 are mounted on the rear frame 11 adjacent the respective upper joint 26 of each hinge 12, 13. Each pin 30 and respective pin stop 31 form abutments which engage when a respective side frame 16, 17 is pivoted outward, and limit outward rotation of side frames 16, 17 to form a divergent acute angle there between.

Another important feature of the present invention is resilient biasing means, generally indicated by 34, mounted adjacent each lower hinge joint 28 and reactively between the side frames 16, 17 and the rear frame 11 which bias the side frames 16, 17 outward. In the preferred embodiment shown in FIG. 2, each lower hinge joint 28 includes a hinge pin 32 which has an end 33 extending axially and externally from the hinge joint 28, and each biasing means is a torsion spring 35 of the helical coil type having a coil 36 mounted about the external end 33 of a hinge pin 32, each torsion spring 35 having one end 37 reacting against a respective side frame 16, 17 and another end 38 having a hook 39 which is engaged and positioned by a positioning means 40 which in the preferred embodiment is an aperture in the rear frame 11. Hook 39 and position means 40 position coil 36 about the pin end 33.

There are front and rear cart support means generally indicated by 41, 42 mounted to and below frames 11, 16, 17. Attached at each lower corner of rear frame 11 is a mounting plate 43 and caster wheel 44. Attached to each front lower corner of side frames 16, 17 is a mounting plate 45 and caster wheel 46.

Shelves 18, 19 which are connected by transverse horizontal axis hinges 14, 15 to rear frame 11 normally are positioned generally horizontal as is shown in FIG. 1 for support of goods placed upon the shelf. The shelves 18, 19 pivot about a respective hinge 14, 15 to an alternate position adjacent to the rear frame 11, as shown in dotted lines in FIG. 2.

Figure 3:
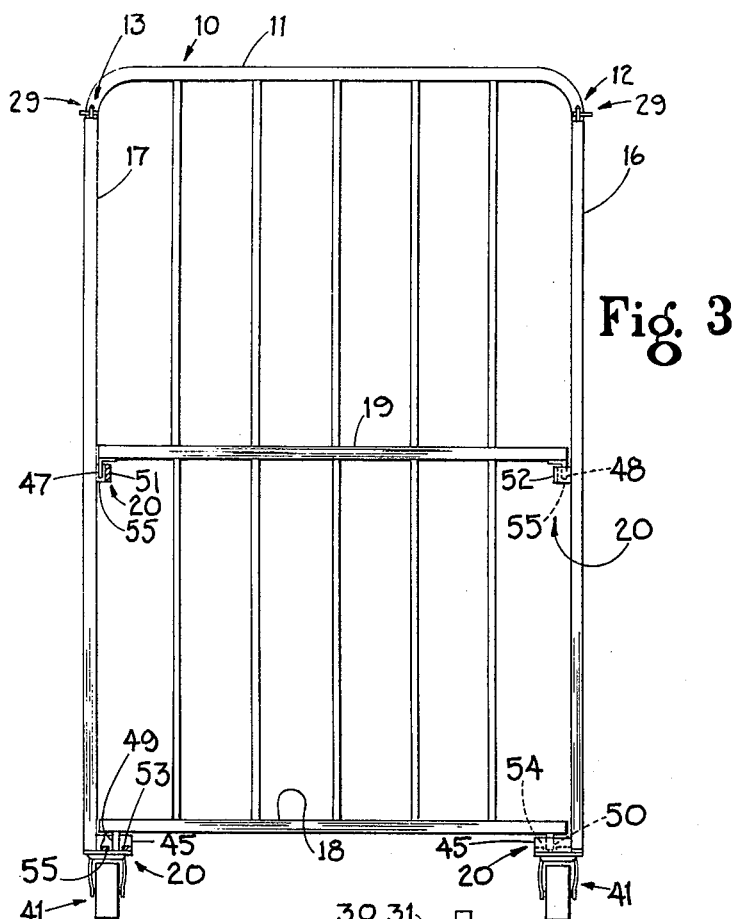
FIG. 3 is a front view of the structure of FIG. 1 with partial sections.

Locking means 20 are provided to secure the side frames 16, 17 and the shelves 18, 19 in positions forming a confinement as seen in FIG. 1, into which goods may be placed. Referring to FIG. 3, each of the lock means 40 includes a vertical projection 47, 48, 49, 50, one of which projections 47–50 is carried on a respective front corner of shelves 18, 19. The vertical projections 47, 48 of upper shelf 19 are lockingly received by clips 51, 52 which are mounted one on each side frame 16, 17. Clips 51, 52 which are mounted on respective horizontal members 24; each form an aperture 55 into which a respective vertical projection 47, 48 will fit when upper shelf 19 is lowered into a normally horizontal position, and also snugly receive the projections 47, 48 to secure the side frames 16, 17 perpendicular to the rear frame 11.

The vertical projections 49, 50 of lower shelf 18 are received in like manner by clips 53, 54 formed integrally with mounting plates 45 wherein an aperture 55 which will snugly receive a respective vertical projection 49, 50 is provided in each mounting plate 45.

Shelves 18, 19 have a normal position which is generally horizontal for support of goods upon the shelves 18, 19, but the shelves can be tilted toward the rear a slight amount in order to prevent goods from sliding off the front of the shelf by lengthening vertical projection 47–50 or relatively lowering transverse hinges 14, 15 at the time when the cart is being manufactured.

Each of lock projections 47–50 are mounted on a respective front corner of shelves 18, 19 and each of the lock clips 51–54 are mounted adjacent the respective front edges of side frames 16, 17 to minimize stress in the lock means 20. The lower lock clips 53, 54 are located in mounting plates 45 directly above the front support means 41 for direct support of the shelf by the support means 41.

Figure 4:
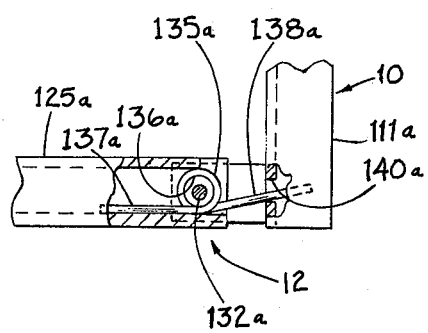
FIG. 4 is a fragmentary cross-sectional vertical view of an alternative hinge and spring structure for the structure of FIG. 1.

An alternative biasing means arrangement is shown in FIG. 4. In this arrangement, the biasing means is concealed within tubular members forming frames of the cart and has an esthetic advantage. Rear frame 111a carries hinge pin 132a about which is pivotally journaled a tubular member 125a of a side frame. Helical torsion spring 135a is mounted within and concealed by the tubular member 125a and is mounted with coil 136a about hinge pin 132a. A first end 137a of the spring 135a reacts against the tubular member 125a and a second end 138a reacts against a positioning means 140a in rear frame 111a.

The outward pivoting of each side frame 16, 17 is limited by engagement of pins 30 against stops 31 which effectively provides outward movement for each of side frames 16, 17 of at least ten degrees and limits outward movement to 25° or less. When the side frames 16, 17 pivot outwardly, they assume alternate nesting positions forming a divergent acute angle as shown in dotted lines of FIG. 6.

When both shelves 18, 19 are raised, lock projections 47–50 and lock clips 51–54 disengage, and the biasing means 34 automatically forces the side frames 16, 17 into the alternate nesting position.

When the side frames 16, 17 are perpendicular to the rear frame 11, the front support means 41 and the rear support means 42 are overlapping or of the same width as seen from the front of the cart 10 as seen in FIG. 3. When the side frames 16, 17 pivot outwardly to the nesting position, the front support means 41 move outwardly to a width greater than the width of the rear support means 42 so that the rear support means 42 of a second, like cart 10a may pass between the front support means 41 for purpose of nesting.

In operation, and when arranged for carrying goods, the cart 10 has the side frames 16, 17 fixed perpendicular to the rear frame 11. At least one of the shelves 18, 19 is in a lowered position wherein locking means 20 are engaged supporting the shelf 18 or 19, and fixing the side frames 16, 17.

Figure 6:
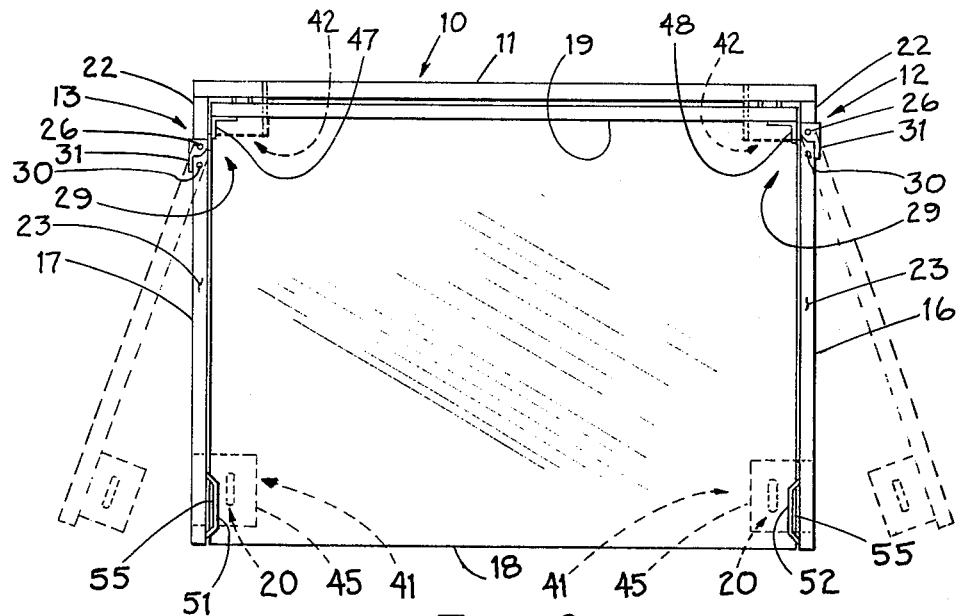
FIG. 6 is a top view, partially diagrammatic, showing the cart of FIG. 1.

As is shown in FIG. 6, the lower shelf 18 is in the horizontal position and is retaining the side frames 16, 17 perpendicular to the rear frame while upper shelf 19 is positioned in an upright storage position adjacent rear frame 11.

When upper shelf 19 is in the storage position as is seen in FIG. 6 and the lower shelf 19 is pivoted upwardly about transverse hinge 14, lock projections 49, 50 and lock clips 53, 54 disengage and thereby free side frames 16, 17 to pivot outwardly about the axis of hinges 12, 13.

Figure 7:
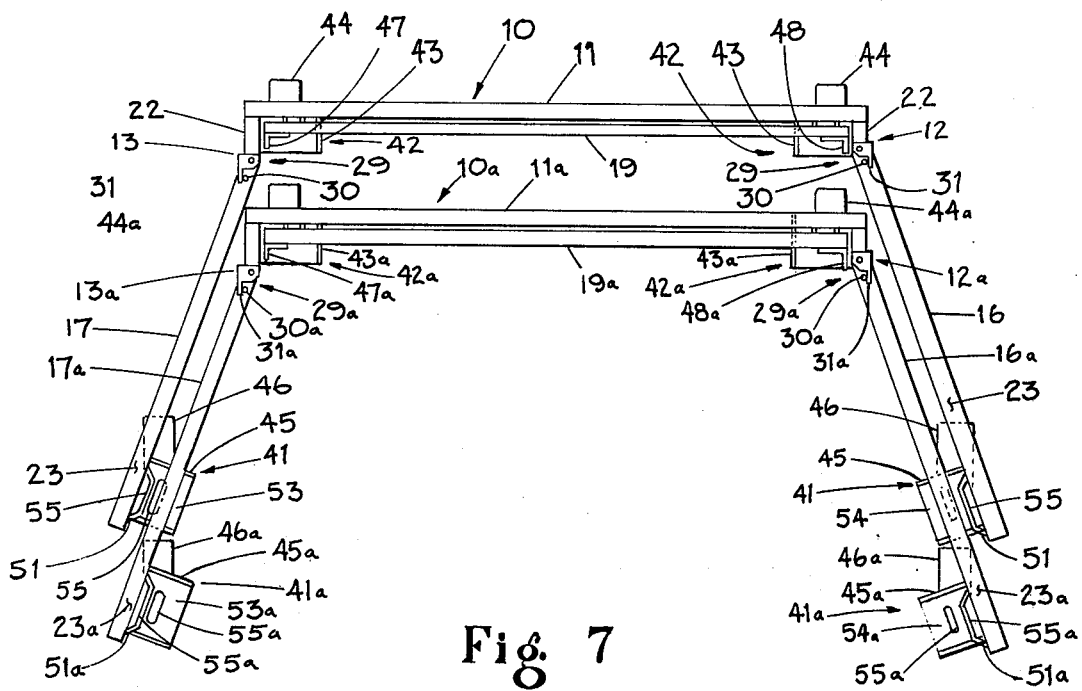
FIG. 7 is a top view showing two of the carts of FIG. 1 nested together.

Nesting of the cart 10 with a like cart 10a is best shown in FIG. 7. When two or more carts 10, 10a are nested as shown, the rear support means 43a of a second cart 10a will pass between front support means 41 of cart 10 and the rear frame 11a of the second cart 10a will enter the divergent opening formed by side frames 16, 17 of cart 10 until the rear frame 11a makes physical contact with the side frames 16, 17. When nested, the side frames 16a, 17a of the second cart 10a overlap the front support means 41 of the first cart 10 which helps prevent the first cart 10 from being rearwardly tippable.

The limit means 29 are positioned adjacent the uppermost joints 26 of hinges 12, 13 in a position to best resist the outward forces applied to the side frame 16, 17 by a user who normally will grasp the nested carts by the side frames 16, 17 at shoulder height which is about the same height as upper horizontal members 23. When two or more carts 10, 10a are nested, they are movable about as a group while remaining in the nested configuration.

Figure 5:
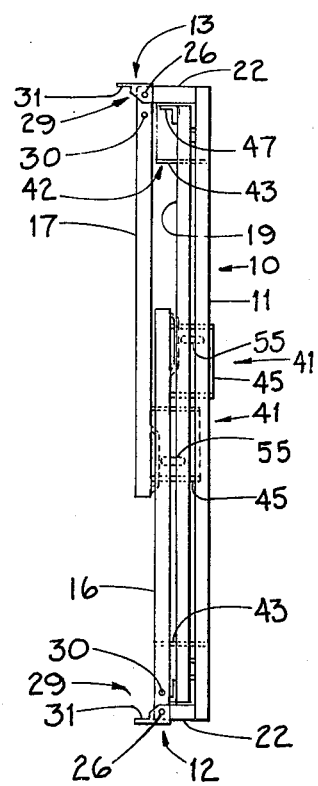
FIG. 5 is a top view, showing the cart of FIG. 1 in a collapsed arrangement.

When the shelves 18, 19 are positioned in a storage position generally parallel and adjacent to the rear frame 11, the side frames 16, 17 are inwardly pivotable to a collapsed position adjacent generally parallel to the rear frame 11 as is shown in FIG. 5. In the collapsed position, the shelves 18, 19 are stored between the rear frame 11 and the side frames 16, 17 and the front support means 41 tuck underneath the shelves 18, 19 and rear frame 11. The biasing means 34 are capable of the resilient travel required to allow the side frames 16, 17 to pivot inwardly.

When the cart 10 is completed by a manufacturer, it is folded to the collapsed position as shown in FIG. 5 and has a binding strap (not shown) tied around it to retain the cart 10 in the collapsed position.

When in the collapsed position, the cart 10 takes very little space and is inventoried and/or shipped, using a minimum of space, and therefore least expensively and is in a configuration most resistant to shipping damage.

When the cart 10 is to be used, the binding strap (not shown) is removed, and the biasing means 34 positioned adjacent to the lower front hinge joints 28 in order to balance biasing force between the frictions of the front support means 41 and the intermediate and upper hinge joints 24, 26, automatically opens the side frames 16, 17 to the nesting position. To then arrange the cart 10 in the normal position for support of goods, the person who is arranging the cart may block one side frame with his foot, take hold of the other side frame 16 with a hand, pull the side frames 16, 17 parallel to each other and using his other hand, lower either one of the shelves 18, 19 into the normal horizontal position and engage the locking means 20 to retain the side frames 16, 17 and support the lowered shelf 18 or 19. The other of the shelves 18, 19 may also be lowered, or may remain stored, or after being lowered may also be raised while the first of shelves 18, 19 maintains side frames 16, 17 in the locked position.

Although various minor modifications may be suggested by those versed in the art, it should be understood that I wish to embody within the scope of the patent warranted hereon, all such embodiments as reasonably and properly come within the scope of my contribution to the art.

I claim as my invention:
1. A nestable merchandise cart comprising:
 a. an upright rear frame of generally rectangular shape;
 b. a pair of vertical side frames disposed at the front of the rear frame and respectively connected by vertical axis hinges to opposite side portions of the rear frame, the side frames being pivotable about a respective vertical axis from a normal position generally perpendicular to the rear frame to a nesting position forming an opening acutely divergent from the rear frame;
 c. a shelf, connected by a horizontal axis hinge to one of the frames, and pivotable between a normally horizontal load carrying position between the side frames and a vertical storage position generally parallel and adjacent to the one frame;
 d. means engageably operable between the shelf and the side frames for locking the side frames generally perpendicular to the rear frame when the shelf is in the horizontal position; and
 e. means affixed on the rear and side frames and operable for limiting outward pivotal movement of the side frames to the nesting position, the limit means for each side frame comprising
  1. a pin mounted on one of the side and rear frames, and
  2. a pin stop mounted on the other of the side and rear frames, the pin and pin stop being positioned for abutting against each other when the respective side frame is in the nesting position.

2. A cart according to claim 1, in which the pins are mounted on the side frames, the side frames and pins being inwardly pivotable about the axis of the vertical hinges into a collapsed position adjacent to the rear frame.

3. A cart according to claim 1, in which the vertical axis hinges each include a plurality of spaced apart hinge joints, the limit means being mounted adjacent to the uppermost hinge joints.

4. A nestable merchandise cart comprising:
 a. an upright rear frame of generally rectangular shape;
 b. a pair of vertical side frames disposed at the front of the rear frame and respectively connected by vertical axis hinges to opposite side portions of the rear frame, the side frames being outwardly pivotable about a respective vertical axis from a normal position generally perpendicular to the rear frame to a nesting position forming an opening acutely divergent from the rear frame;
 c. a shelf connected by a horizontal axis hinge to one of the frames and pivotable between a normally horizontal load carrying position between the side frames and a vertical storage position generally parallel and adjacent to the one frame;
 d. means engagably operable between the shelf and the side frames for locking the side frames generally perpendicular to the rear frame when the shelf is in the horizontal position;
 e. means affixed to the frames and operable for limiting outward pivotal movement of the side frames; and
 f. means attached to each side frame respectively, and reactively from each side frame to one of the other frames for resiliently biasing the side frames pivotally outward about a respective vertical hinge axis from the normal position to the nesting position.

5. A cart according to claim 4, including a second such shelf and lock means, either of the shelves being movable between load carrying and storage positions while the other shelf and lock means retains the side frames in the locked position.

6. A cart according to claim 4, in which the biasing means comprises a pair of torsion springs mounted reactively, one each between a respective side frame and the rear frame.

7. A cart according to claim 6, in which the springs are of the helical coil type.

8. A cart according to claim 7, in which each spring has a coil and first end mounted within a tubular member of a respective frame, and a second end projecting from the tubular member and reactively engaging the other frame.

9. A cart according to claim 7, in which the vertical axis hinges each include a vertical hinge pin, each helical coil torsion spring being mounted with the coil about a respective hinge pin.

10. A cart according to claim 9, in which each spring has an end hook engaging a respective means in a frame for positioning the coil.

11. A cart according to claim 9, in which each hinge pin extends axially externally from a respective hinge joint, each spring being mounted with the spring coil about the external axial extension of a respective hinge pin.

12. A cart according to claim 4, in which the vertical axis hinges each have a lowermost hinge joint, the biasing means being reactively attached to the side frames adjacent to lowermost hinge joints.

13. A cart according to claim 4, in which the biasing means comprises a pair of springs, each spring having one end mounted to a respective side frame and a second end reactively mounted to the rear frame.

14. A cart according to claim 4, in which the limiting means are affixed on the rear and side frames.

15. A cart according to claim 4, in which the side frames are each inwardly pivotable about the axis of a respective vertical hinge to a collapsed position generally parallel and adjacent to the rear frame, the biasing means being capable of resilient travel through such inward pivoting.

16. A cart according to claim 4, in which the vertical axis hinges each have an uppermost and lowermost hinge joint, the biasing means being attached to the side frames adjacent to the lowermost hinge joint, the limit means being mounted to the side and rear frames adjacent to the uppermost hinge joints.

* * * * *